United States Patent [19]

Sczomak

[11] Patent Number: 4,693,424

[45] Date of Patent: Sep. 15, 1987

[54] POPPET COVERED ORIFICE FUEL INJECTION NOZZLE

[75] Inventor: David P. Sczomak, Troy, Mich.

[73] Assignee: General Motors Corporation, Detroit, Mich.

[21] Appl. No.: 889,259

[22] Filed: Jul. 23, 1986

Related U.S. Application Data

[63] Continuation-in-part of Ser. No. 754,769, Jul. 15, 1985, abandoned.

[51] Int. Cl.⁴ .................... B05B 1/32; F02M 61/10
[52] U.S. Cl. .............................. 239/453; 239/533.11
[58] Field of Search .............. 239/453, 454, 455, 456, 239/533.3–533.12

[56] References Cited

U.S. PATENT DOCUMENTS

| | | | |
|---|---|---|---|
| 1,342,486 | 6/1920 | Wolfard | 239/453 |
| 2,035,203 | 3/1936 | Smith | 299/107.6 |
| 2,295,081 | 9/1942 | Harvath | 299/107.5 |
| 2,521,224 | 9/1950 | Kammer | 299/107.6 |
| 2,762,654 | 9/1956 | Purchas, Jr. et al. | 299/107.2 |
| 3,982,693 | 9/1976 | Hulsing | 239/88 |
| 4,082,224 | 4/1978 | Mangus | 239/453 |
| 4,153,200 | 5/1979 | Fenne | 239/453 |

FOREIGN PATENT DOCUMENTS

| | | |
|---|---|---|
| 802968 | 2/1951 | Fed. Rep. of Germany . |
| 2542727 | 3/1977 | Fed. Rep. of Germany . |
| 827877 | 5/1938 | France . |
| 2289756 | 5/1976 | France . |
| 726248 | 3/1955 | United Kingdom ............. 239/533.3 |
| 1521065 | 8/1978 | United Kingdom . |

Primary Examiner—Andres Kashnikow
Assistant Examiner—Patrick N. Burkhart
Attorney, Agent, or Firm—Arthur N. Krein

[57] ABSTRACT

A poppet covered orifice fuel injector nozzle for use in a direct injection type diesel engine has a spray tip with a spring biased poppet valve journaled for reciprocable movement therein, the lower reduced diameter free end of the spray tip and the head of the poppet valve having opposed frusto-conical valve seat surfaces with a differential angle of about 2° so that seating engagement occurs at the outer peripheral edges thereof. The poppet valve has a fuel supply passage extending through the stem thereof for flow communication with a plurality of circumferentially spaced apart radial orifices that are inclined and located so as to discharge fuel parallel to and directly across the valve seat surface of the poppet valve.

3 Claims, 5 Drawing Figures

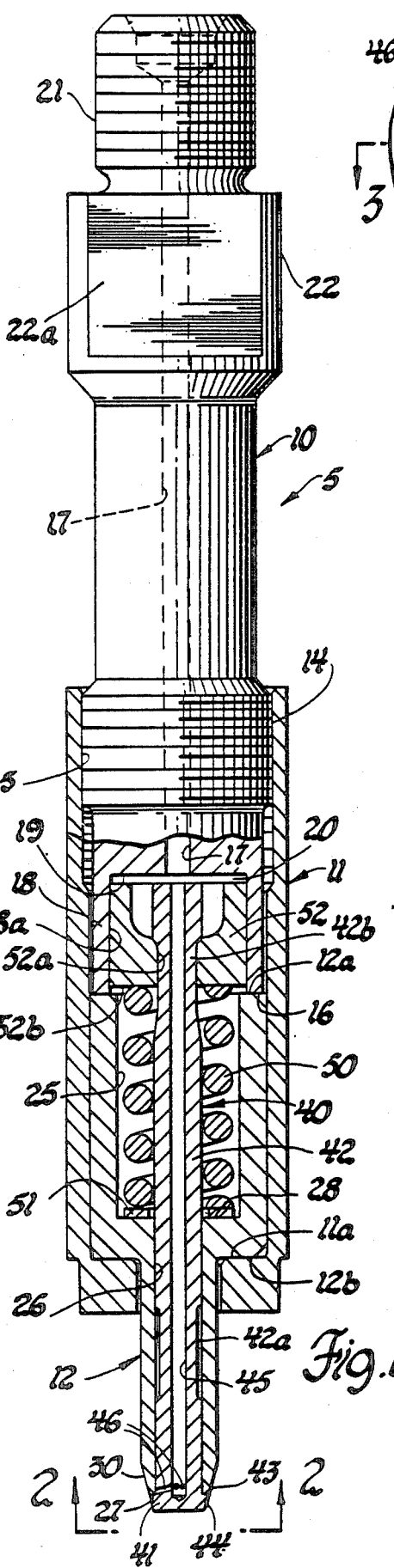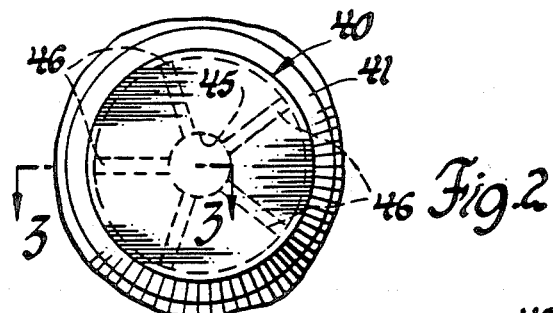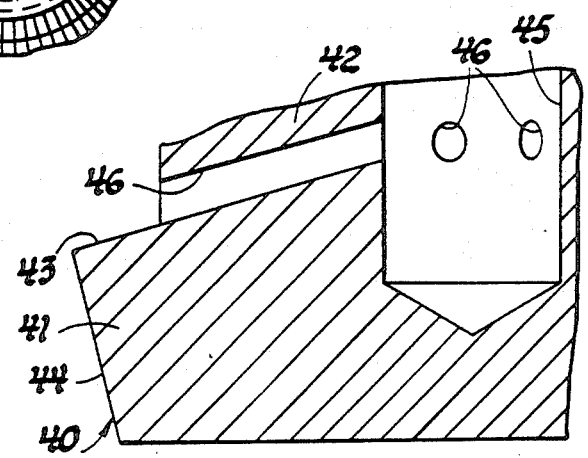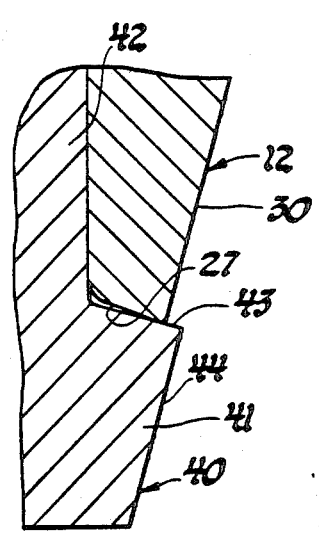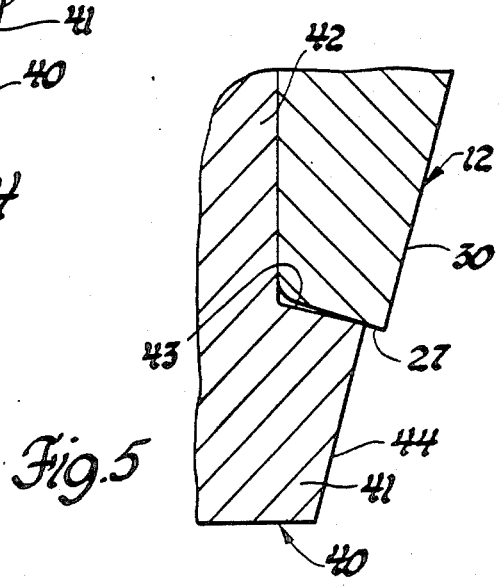

POPPET COVERED ORIFICE FUEL INJECTION NOZZLE

This is a continuation-in-part of copending U.S. patent application Ser. No. 754,769 filed July 15, 1985 (now abandoned), assigned to the same assignee.

FIELD OF THE INVENTION

This invention relates to liquid fuel injection nozzles for internal combustion engines and, in particular, to such an injection nozzle of the outward opening poppet valve type for use in a direct injection type diesel engine.

DESCRIPTION OF THE PRIOR ART

Fuel injection nozzles of the outward opening, poppet valve type for use in diesel engines are well known. In this type of injection nozzle, there is provided a closure member, in the form of a poppet valve, that is movable to an open position relative to an associate valve seat by a high pressure pump, and that is movable to its closed position in seating engagement with the valve seat by a spring acting on a collar positioned so as to loosely encircle the stem of the poppet valve whereby it can abut against an enlarged head at the inner end of the stem of the poppet valve.

Exemplary embodiments of such fuel injection nozzles that have spray discharge orifices associated with the poppet valve that are uncovered upon opening movement of the poppet valve are disclosed, for example, in U.S. Pat. No. 2,521,224, entitled "Pilot Fuel Injector", issued Sept. 5, 1950 to George S. Kammer and in U.S. Pat. No. 4,082,224, entitled "Fuel Injection Nozzle", issued Apr. 4, 1978 to Ervin E. Mangus.

However, because of current and future emission standards, all such prior known fuel injection nozzles appear to be unsuitable for use in direct injection type diesel engines because of poor injected fuel penetration at light engine loads, which can also result in high smoke levels.

SUMMARY OF THE INVENTION

It is therefore, a primary object of the present invention to provide an improved fuel injection nozzle for use in direct injection type diesel engines that is operable in a manner whereby to substantially eliminate carbon build-up on the cooperating spray discharge elements thereof without affecting the spray pattern of the fuel being discharged therefrom by the use of a poppet valve and an arrangement of spray orifices whereby the spray orifices are covered upon closure of the poppet valve.

Accordingly, another object of the invention is to provide an improved fuel injection nozzle of the outward opening, poppet valve type wherein the stem of the poppet valve has a fuel passage therein to supply fuel to circumferentially spaced apart relatively fluid dynamically thick radial discharge orifices that are located and inclined so as to discharge fuel parallel to and directly across the frusto-conical seating surface of the head of the poppet valve which in turn is adapted to seat against the outer edge of a frusto-conical valve seat encircling the lower discharge end of the spray tip body of the injection nozzle.

A further object of the invention is to provide an improved fuel injection nozzle so constructed whereby it will remain substantially free of carbon build-up during extended operation thereof in a direct injection type diesel engine.

For a better understanding of the invention, as well as other objects and further features thereof reference is had to the following detailed description of the invention to be read in connection with the accompanying drawings.

BRIEF DESCRIPTION OF THE DRAWINGS

FIG. 1 is an enlarged longitudinal, cross-sectional view of a fuel injection nozzle constructed in accordance with the invention, showing the upper tube like fitting thereof partly in elevation;

FIG. 2 is an enlarged end view of the poppet valve, per se of the injection nozzle of FIG. 1, taken along line 2—2 of FIG. 1;

FIG. 3 is a further enlarged cross-sectional view of a portion of the poppet valve, per se, taken along line 3—3 of FIG. 2; and, FIGS. 4 and 5 are enlarged, exaggerated sectional views of a portion of the lower seating ends of spray tip and poppet valve, per se, of FIG. 1, showing desired maximum valve-to-seat overlap and seat-to-valve overlap, respectively.

Referring now first to FIG. 1, there is illustrated a preferred embodiment of an outward opening, poppet covered orifice fuel injection nozzle, generally designated 5, constructed in accordance with the invention. The fuel injection nozzle 5 is of a type that is adapted to be mounted, for example, in a suitable nozzle receiving socket formed for this purpose in the cylinder head, not shown of a direct injection type diesel engine with the spray tip end thereof suitably located so as to discharge fuel into an associated combustion chamber of the engine, the injection nozzle 5 being adapted to be axially retained by a suitable yoke type clamp, not shown, in a manner well known in the art.

The poppet covered orifice fuel injection nozzle 5, in the construction illustrated is provided with a multi-piece nozzle housing that includes a tube-like inlet fitting 10, a tubular nut 11 and a spray tip 12 suitably secured together in a conventional manner. Thus in the construction illustrated, the inlet fitting 10 is secured to the nut 11 by threaded engagement of the external threads 14 thereof with the internal threads 15 at the upper end of the nut 11, with reference to FIG. 1, whereby the upper end surface 12a of the spray tip 12 abuts against the lower face 16 of the inlet fitting 10 and its lower shoulder 12b abuts against the internal shoulder 11a of nut 11.

As shown, the fitting 10 is provided with an axial stepped bore therethrough to define a circular stepped upper wall 17 forming an inlet passage that extends downward from the upper or free end of the fitting so as to open at its other end into a cylindrical fuel chamber 20 defined in part by the circular internal wall 18a of the lower reduced diameter tubular portion 18 of this inlet fitting. Walls 18a and 17 are interconneted by a flat shoulder 19.

In addition, the inlet fitting 10 at its upper end is provided with suitable external threads 21 whereby a fuel supply tube and associate tube coupling, both not shown, can be secured thereto so that the injection nozzle 5 can be intermittently supplied with fuel, for example, as by a high pressure distribution pump, not shown, in a conventional manner, and next adjacent to the threaded portion 21 there is provided an enlarged external diameter portion 22 having at least one set of opposed flats 22a therein sized to effect attachment of the injection nozzle 5 to a cylinder head as by a clamp yoke, not shown, in a manner well known in the diesel fuel injection art.

Spray tip 12, of stepped external cylindrical configuration, is provided with an axial stepped bore therethrough so as to define an internal upper wall 25 of a predetermined internal diameter less than that of the wall 18a of the inlet fitting 10, and a lower valve stem guide wall 26 of reduced predetermined internal diameter, which at its lower free end is encircled by a frusto-conical valve seat 27 of a predetermined included angle. Walls 25 and 26 are interconnected by a flat shoulder 28. As best seen in FIGS. 1, 4 and 5, the lower outer peripheral end of the spray tip 12 is relieved as by a chamfer 30 so as to intersect the valve seat 27 and to define therewith a so-called knife edge whereby the valve seat 27 is of a predetermined maximum external diameter for a purpose to be described in detail hereinafter. Preferably, the chamfer is formed at an angle of about 15° to 20° relative to the axis of the spray tip. It will be appreciated that increasing the chamfer angle above the preferred range noted, can be made, but for reasons which will become apparent hereinafter, such increase can result in the undesired build-up of carbon deposits.

Fuel discharge from the lower end of the spray tip 12 is controlled by means of an injection valve in the form of a poppet valve 40, that includes a head 41 with an elongated valve stem 42 extending therefrom, the lower portion of the valve stem being of a predetermined external diameter whereby it is reciprocably and sealingly guided by the valve stem guide wall 26 and which is of an axial extent so as to extend loosely into the fuel chamber 20 but axially spaced apart from shoulder 19. Preferably, as shown in FIG. 1, an intermediate portion of the valve stem 42 slidably received by the valve stem guide wall 26 is provided with an annular groove 42a of predetermined axial extent whereby to reduce the contact area between the valve stem 42 and the guide wall.

The head 41 of the poppet valve 40 is preferably of a predetermined maximum external diameter corresponding to the external diameter of the valve seat 27 and is provided with an annular frusto-conical valve seat surface 43 formed complementary to valve seat 27 but with a predetermined included angle such that preferably the valve seat 27 and valve seat surface 43 effect seating engagement at least at one and preferably at both their outer peripheral edges. Preferably, as shown, the head 41 below the valve seat surface 43 is also provided with a chamfer 44 formed complementary to the chamfered 30 lower end of the spray tip 12.

However, because of the usual manufacturing tolerance encountered in mass production of injection nozzles, some overlap of the valve seat surface 43 of the poppet valve 40 relative to the valve seat 27 can be tolerated. Accordingly, in a particular injection nozzle application, the poppet valve 40 is selectively mated to a spray tip 12, such that the valve seat surface 43 of its head 41 can overhang the valve seat 27 of the spray tip 12 by a maximum of 0.01 mm as shown in FIG. 4 or the valve seat of the spray tip 12 can overhang the valve seat surface 43 of the poppet valve head 41 by a maximum of 0.01 mm as shown in FIG. 5. However, in another preferred injection nozzle application, the assembly of the poppet valve 40 and spray tip 12 is ground on its outside peripheral surface, as necessary to ensure zero overhang of the poppet valve 40 and spray tip 12 as shown in FIG. 1. Again with references to FIGS. 4 and 5, the angles of and therefore the clearance between the valve seat 27 of the spray tip 12 and the valve seat surface 43 of the poppet valve 40 have been exaggerated so as to more clearly show edge contact of the valve seat and relative overhang of the respective elements.

The reason for limiting such overhang is due to the fact that any exposed surface radially outward of the actual sealed interface of the valve seat 27 and valve seat surface 43 can and will be wetted by fuel during the injection cycle and fuel thus collected on such exposed wetted surfaces can result in high hydrocarbon emissions during the combustion process then occurring in the associated combustion chamber, not shown. Thus it is desirable to reduce such surface area which can be wetted by fuel to a minimum. In addition, with the chamfered spray tip 12 and head 41 arrangement shown, it appears that any carbon deposit which may engage any exposed valve seating surface either will fall off and/or burn off more readily due to the preferred range of the chamfer angle described hereinabove.

Preferably the differential angle between the included angles of the valve seat 27 and that of the valve seat surface 43, should be about or preferably less than 2°, whereby sealing will always occur at least at the outer edge of the valve seat 27 or at the outer edge of the valve seat surface 43 and, preferably at both their outer annular edges. Thus, by way of an example, in a particular application, the angle of the valve seat 27 was 149°+0.15' while that of the valve seat surface 43 was 151°. With this arrangement, the volume of fuel trapped outside of the fuel discharge orifices 46, described next hereinafter, yet inside of the valve seat engagement surfaces will be held to a minimum.

Extending axially through the stem 42 of the poppet valve 40 is an internal fuel passage 45 that is open at the upper free end of the valve stem for flow communication with the fuel in the fuel chamber 20 and which at its lower end is in flow communication with a plurality of circumferentially equally spaced apart, radially outward extending, and downwardly directed fuel discharge orifices 46 of predetermined diameters, as desired, five such discharge orifices 46 being used in the embodiment shown as best seen in FIG. 2.

As best seen in FIG. 3, the axis of each such discharge orifice 46 is inclined at an angle parallel to the surface of the valve seat surface 43 on the head 41 of the poppet valve 40 and each such discharge orifice 46 is axially located so that the valve seat surface 43 is substantially tangent as close as possible to the lower outlet end of each such discharge orifice 46, as shown in this Figure, so as to provide for maximum fuel spray penetration upon opening movement of the poppet valve 40 during a fuel injection cycle.

For this reason and as best seen with reference to FIGS. 2 and 3, each of the discharge orifices 46 is relatively fluid dynamically thick, with preferably an L/D ratio in the order of 4 to 8, wherein L is the effective axial length of a discharge orifice and D is the diameter of the discharge orifice. Thus in a particular embodiment, each discharge orifice 46 had a nominal length L of 1.25 mm and an average diameter D of 0.194, with each discharge orifice 46 having an L/D ratio of approximately 6.4. Also as shown, the total cross-sectional flow area of the fuel passage 45 is made substantially greater than the combined cross-section flow area of the discharge orifices 46.

In addition, although the discharge orifices are illustrated as all of them having a small gap uniform between the lowest edge of the discharge orifice 46 and the corner of the valve seat surface 43 which may be on the order of about 0.05 mm or less, it should be realized, however, that for the purposes of controlling the discharge orifice area versus lift for a particular engine application, the height of the discharge orifices 46 may be staggered. In such a situation the highest discharge orifice 46 may be, for example, 0.15 mm above the corner of the valve seat surface 43 but, however, at least one or more of the discharge orifices 46 are still located approximately 0.05 mm above the corner of the valve seat surface 43 to insure penetrating fuel sprays as soon as the poppet valve 40 lifts from the valve seat 27.

Also as best seen in FIGS. 4 and 5, the clearance between the lower end of the vale stem guide bore 26 and valve seat 27 corner of the spray tip 12 and the stem 42 and valve seat surface 43 corner of the poppet valve 40 is kept to a minimum while still avoiding interference between these elements whereby the quantity or volume of fuel trapped outside the discharge ends of the discharge orifices is kept to a minimum when the poppet valve 40 is in its closed position, so that this volume of fuel represents only a very small percentage of fuel to be injected on the next injection cycle especially at the lower rates of fuel injection such as when the engine is operating in the idle mode of operation.

Thus in the particular embodiment referred to herein, the volume of fuel trapped in this clearance annulus was approximately 0.056 mm$^3$ whereas the total quantity of fuel to be injected per injection cycle at engine idle was 5 mm$^3$. Accordingly, in this particular embodiment and engine application, the volume of trapped fuel represented only about 1.1% of the total volume of the idle fuel quantity per injection cycle during idle and thus this trapped fuel volume had no significant effect on exhaust emissions. In addition, in this embodiment, since the volume is a discharge orifice 41 was approximately 0.037 mm$^3$, and the trapped fuel volume outside the discharge orifice was approximately 0.056 mm$^3$, this trapped fuel volume is only approximately 1.4 times the fuel volume in a single discharge orifice 46.

The poppet valve 40 is normally biased to a valve closed position relative to the valve seat 27, the position shown in FIGS. 1, 4 and 5, by means of a valve return spring 50 loosely encircling a portion of the valve stem 42 with the spring cavity defined in part by the internal upper wall 25 of the spray tip 12. As shown, one end or lower end of the spring, which is of predetermined force, abuts against a washer shim 51 of predetermined thickness, as desired, while the opposite or upper end, with reference to FIG. 1, of the spring 50 abuts against the lower end of a spring keeper 52 suitably fixed to the upper free end portion of the valve stem 42. The spring keeper 52 is of conventional construction and is formed so as to be of cylindrical configuration with an outside diameter suitably less than the internal diameter of the wall 18a in the lower tubular portion 18 of the inlet fitting 10 and is provided with a key-like aperture 52a whereby the valve stem 42 can be inserted axially therein and then moved radially so that the reduced diameter portion 42b of the valve stem 42 can be engaged in the reduced diameter portion of the key-hole aperture 52a.

With this arrangement, the spring keeper 52 is fixed to the valve stem against axial movement in one direction, upward with reference to FIG. 1. Also with this spring keeper 52 arrangement, since the lower surface 52b thereof is positioned so as to abut against the upper end surface 12a of the spray tip 12 whereby to limit opening movement of the poppet valve 40, this spring keeper 52 can be easily removed from the valve stem 42 for grinding of the surface 52b, if necessary, to obtain the predetermined desired lift for the poppet valve 40. Of course, with the construction shown, the upper free ends of both the valve stem 42 and of the spring keeper 52 are axially spaced, as desired from the internal shoulder 19 of the inlet fitting 10, when the poppet valve 40 is in the closed position shown.

A poppet covered orifice fuel injection nozzle in accordance with the subject invention will result in lower hydrocarbon engine emissions because the poppet valve 40 is operative to close off the fuel in the discharge orifices 46 and thus there is no exposed fuel when the poppet valve is closed and, of course with the poppet valve 40 head and spray tip 12 end configuration, there is little, if any, exposed surfaces which can be wetted by fuel. In addition lower combustion noises will result because the poppet head 41, valve seat surface 43 and valve seat 27 serves to throttle the fuel flow at the beginning of each injection cycle. Furthermore, the subject fuel injection nozzle can operate at lower peak fuel pressure levels than other known injectors because fuel can flow from the subject injection nozzle in a more efficient manner because of the location of the discharge orifices relative to the valve seat surface 43 of the poppet valve and since larger size discharge orifices 46 can be used without suffering a hydrocarbon penalty.

While the invention has been described with reference to the structure disclosed herein, it is not confined to the details set forth, since various changes or modifications will be apparent to those skilled in the art. For example, although the poppet covered orifice fuel injection nozzle 5 has been illustrated and described as being of the type that is retained by a clamp yoke, the nut 11, for example, may be provided with external threads for threaded engagement with an internally threaded nozzle receiving socket in a manner well known in the art. Accordingly, this application is intended to cover such modifications or changes as may come within the purposes of the improvement or the scope of the following claims.

The embodiments of the invention in which an exclusive property or privilege is claimed are defined as follows:

1. A poppet covered orifice fuel injector nozzle for use in a direct injection type diesel engine, said fuel injector nozzle including an injector body means having an inlet for pressurized fuel at one end thereof and having a spray tip at the opposite end thereof; said spray tip having a discharge free end and having an axial stepped through bore of predetermined internal diameter therein at its discharge free end with an annular frusto-conical valve seat encircling said bore at said discharge free end of said spray tip, an outward opening poppet valve operatively positioned in said injector body means, said poppet valve including an annular head with a frusto-conical valve seat surface positioned for movement between a closed position and an outward open position relative to said valve seat and a stem portion extending from said head that is slidably received in said bore; said poppet valve having an internal passage means in fluid communication at one end with said inlet and terminating at its other end in circumferentially spaced apart radial orifices that are inclined and located so as to discharge fuel parallel to and directly across said valve seat surface of said head; each of said orifices having a Length of orifice to Diameter of orifice ratio on the order of 4 to 8; and spring means operatively associated with said poppet valve to normally bias said head of said poppet valve to said closed position; said frusto-conical valve seat and said valve seat surface together with said discharge free end of said spray tip being configured so that said valve seat surface will effect sealing engagement with said valve seat at substantially the outer peripheral edge thereof with substantially no overhang of these elements with respect to each other whereby to prevent fuel wetting during injection when said head is moved to said open position and to prevent fuel flow from said orifices when said head is in said closed position.

2. A poppet covered orifice fuel injector nozzle for use in a direct injection type diesel engine, said fuel injector nozzle including an injector body means having an inlet for pressurized fuel at one end thereof and having a spray tip having a discharge free end at the opposite end thereof; said spray tip being of stepped external diameter with a reduced diameter discharge free end and having an axial bore of predetermined internal diameter extending through said reduced diameter end portion with an annular frusto-conical valve seat encircling said bore at the discharge free end of said spray tip, an outward opening poppet valve operatively positioned in said injector body means, said poppet valve including an annular head with a frusto-conical valve seat surface with a differential angle of about 2° relative to said valve seat and positioned for movement between a closed position and an outward open position relative to said valve seat and a stem portion extending from said head that is slidably received in said bore; said poppet valve having an internal passage means in fluid communication at one end with said inlet and terminating at its other end in circumferentially spaced apart radial orifices that are inclined and located next to said valve seat surface so as to discharge fuel parallel to and directly across said valve seat surface of said head; each said orifices having an L/D ratio on the order of approximately 4 to 8; and spring means operatively associated with said poppet valve to normally bias said head of said poppet valve to said closed position; said valve seat surface and said valve seat together with said discharge free end of said spray tip body being configured so that said seat surface will effect sealing engagement with said valve seat at substantially the outer peripheral edge thereof with substantially no overhang of these elements with respect to each other whereby to prevent fuel wetting during injection when said head is moved to said open position and to prevent fuel flow from said orifices when said head is in said closed position.

3. A poppet covered orifice fuel injector nozzle for use in a direct injection type diesel engine, said fuel injector nozzle including an injector body means having an inlet for pressurized fuel at one end thereof and having a spray tip with a discharge free end at the opposite end thereof; said spray tip having a radially inward tapered lower discharge free end portion with an axial through bore of predetermined internal diameter therein and with an annular frusto-conical valve seat encircling said bore at the discharge free end of said spray tip, an outward opening poppet valve operatively positioned in said injector body means and journaled in said spray tip, said poppet valve including an annular head with a frusto-conical valve seat surface formed complementary to but with approximately a differential angle of 2° relative to said valve seat and positioned for movement between a closed position and an outward open position relative to said valve seat and a stem portion extending from said head that is slidably received in said bore; said poppet valve having an internal passage means in fluid communication at one end with said inlet and terminating at its other end in a plurality of circumferentially spaced apart radial orifices that have an L/D ratio of approximately 4 to 8, with each such said orifice being inclined and located so as to discharge fuel parallel to and directly across said valve seat surface of said head; and spring means operatively associated with said poppet valve to normally bias said head of said poppet valve to said closed position; said head and said valve seat surface thereon and said valve seat together with said discharge free end of said spray tip body being configured so that said seat surface will effect sealing engagement with said valve seat at substantially the outer peripheral edge thereof with substantially no overhang of these elements with respect to each other whereby to prevent fuel wetting during injection when said head is moved to said open position, to prevent fuel flow from said orifices when said head is in said closed position and to substantially prevent carbon deposits adjacent to the exterior of said valve seat and said valve seat surface.

* * * * *